United States Patent [19]
Staley et al.

[11] Patent Number: 5,261,722
[45] Date of Patent: Nov. 16, 1993

[54] VARIABLE OPACITY, MAXIMALLY TRANSVERSE RETRACTING SUNROOF SYSTEM

[75] Inventors: Dennis W. Staley, Birmingham; Brad Garska, Ypsilanti; Werner T. Heuhn, Milford, all of Mich.

[73] Assignee: ASC Incorporated, Southgate, Mich.

[21] Appl. No.: 719,670

[22] Filed: Jun. 24, 1991

Related U.S. Application Data

[63] Continuation of Ser. No. 453,680, Dec. 20, 1989, abandoned.

[51] Int. Cl.5 ............................................. B60J 7/047
[52] U.S. Cl. ................................... 296/211; 296/215; 296/216; 296/220
[58] Field of Search ................. 296/211, 215, 216, 220

[56] References Cited

U.S. PATENT DOCUMENTS

| 2,482,429 | 9/1949 | Mobbs et al. | 296/222 |
| 4,416,487 | 11/1983 | Hirotani et al. | 296/222 |
| 4,695,090 | 9/1987 | Draper | 296/216 |
| 4,749,225 | 6/1988 | Fuerst et al. | 296/216 |
| 4,749,261 | 6/1988 | McLaughlin | 350/339 R |
| 4,934,753 | 6/1990 | Gajewski | 296/216 |

FOREIGN PATENT DOCUMENTS

| 3644492 | 7/1987 | Fed. Rep. of Germany | 296/216 |
| 3830484 | 3/1989 | Fed. Rep. of Germany | 296/211 |
| 2577175 | 8/1986 | France | 296/216 |
| 0060322 | 3/1986 | Japan | 296/216 |
| 0115719 | 6/1986 | Japan | 296/211 |
| 0282020 | 11/1989 | Japan | 296/211 |
| 0282023 | 11/1989 | Japan | 296/211 |

OTHER PUBLICATIONS

Installing Sunroofs and T-Tops, copyright 1985, Tab Books, TL275.C33, Blug Ridge Summit, Pa. 17214, pp. 81-89.
Popular Science, Dec. 1987, pp. 68-70 "Smart Windows" and Electrochromatic Sunroof.

*Primary Examiner*—Dennis H. Pedder
*Attorney, Agent, or Firm*—Harness, Dickey & Pierce

[57] ABSTRACT

A selective opacity, maximally transverse retracting sunroof system for a vehicle roof is retrofitted to a vehicle by removing most of the original vehicle roof side rails and attaching thereto a strut assembly capable of supporting a self-contained sunroof mechanism to be attached thereto. The sunroof panel of the mechanism then is capable of covering the vehicle roof aperture from side rail-to-side rail. To decrease the undesired effects of a large, clear roof, the sunroof panel opacity may be chosen by the operator. Opacity of the panel is electrically controlled and provision is made for supplying power to the sunroof panel throughout its range of movement. A second, selective opacity roof panel may be used in the vehicle roof structure to maximize the light transmitting area of the roof.

23 Claims, 2 Drawing Sheets

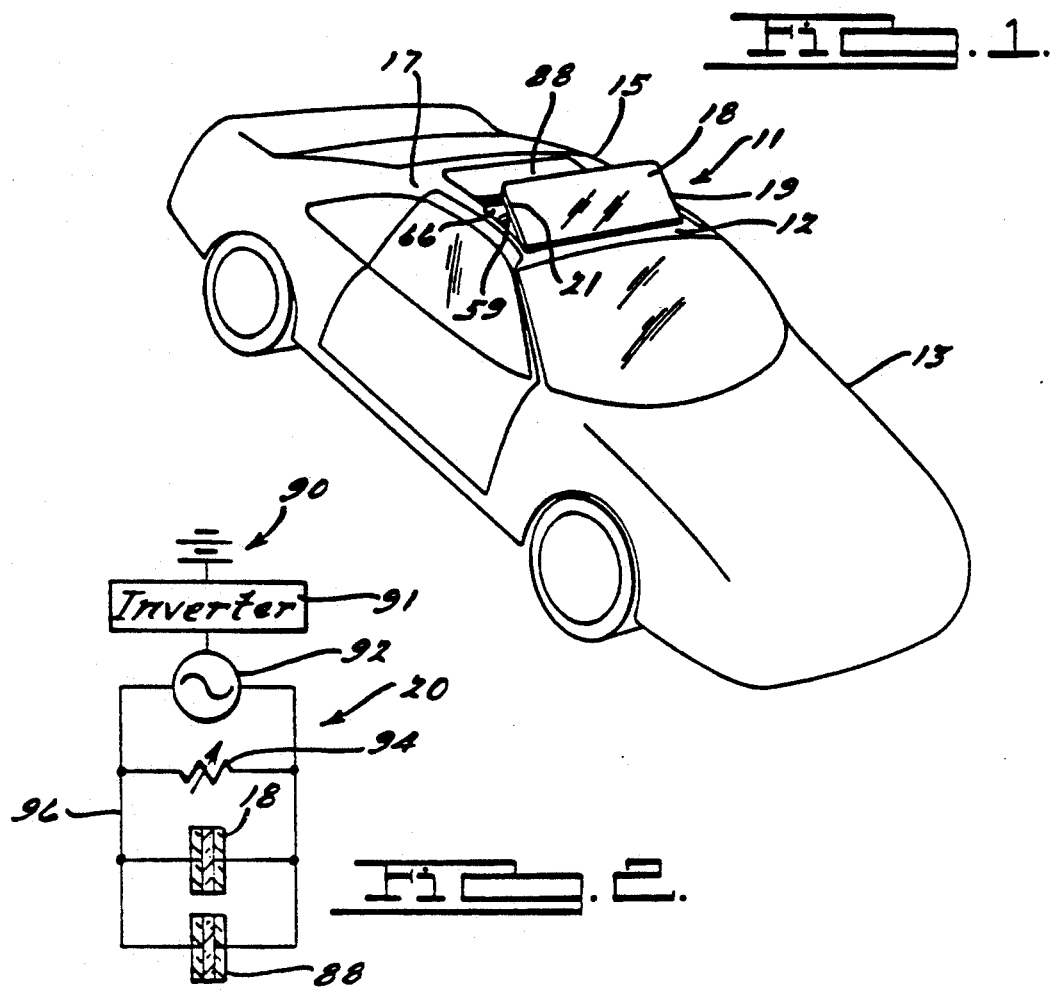
Fig. 1.
Fig. 2.
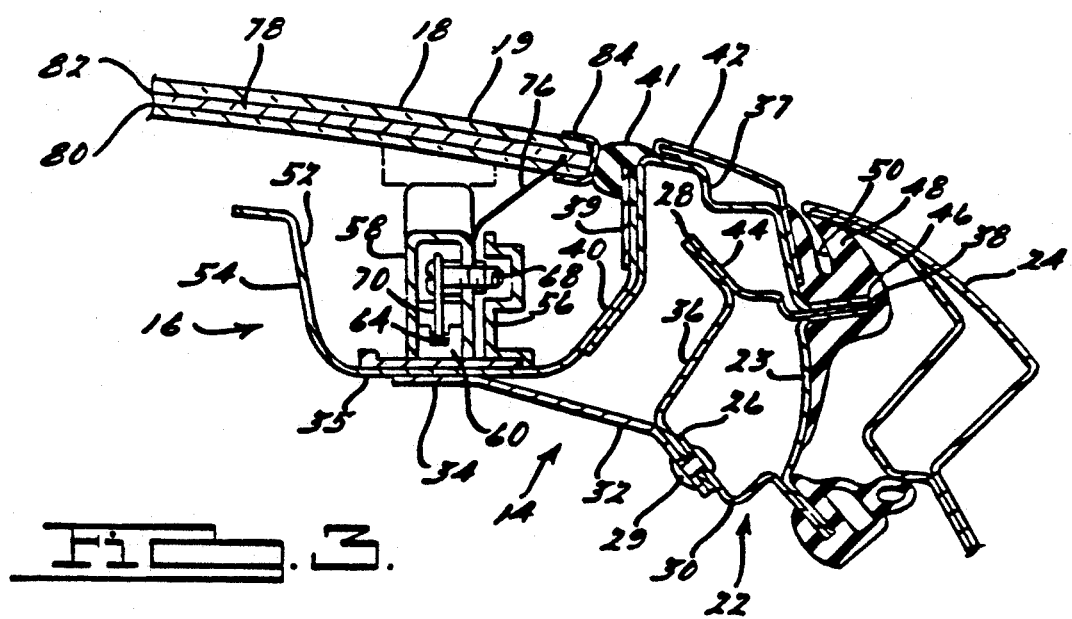
Fig. 3.

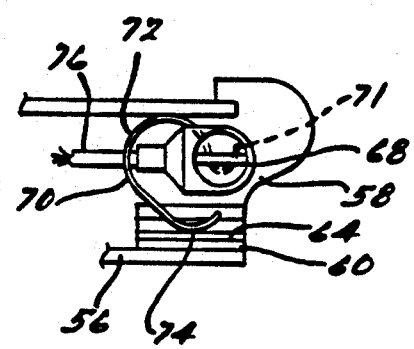
FIG. 3.
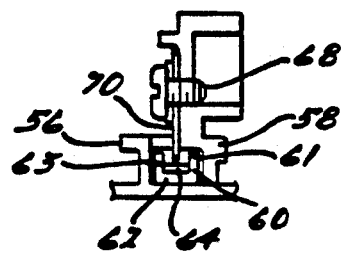
FIG. 4.
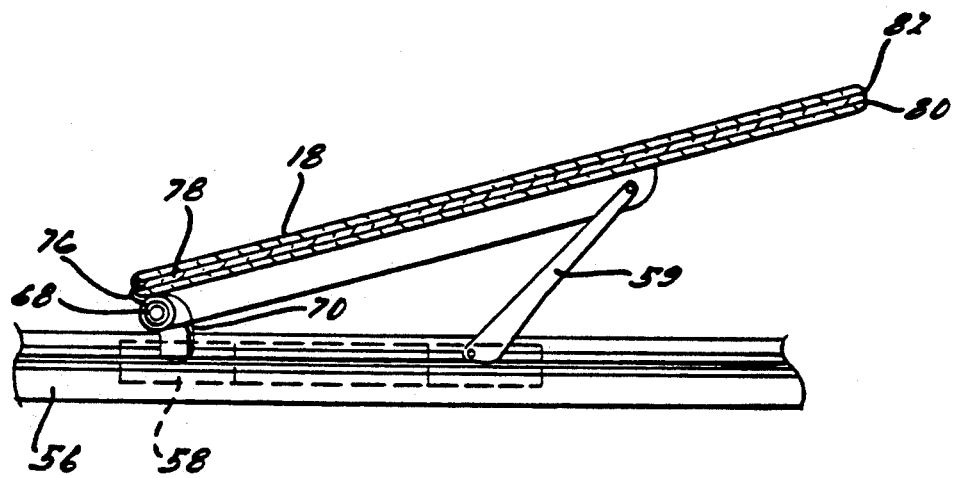
FIG. 6.
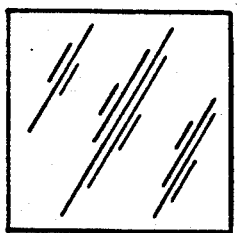 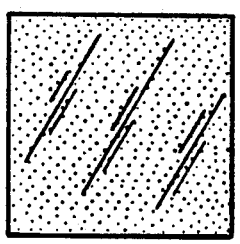 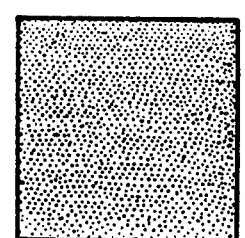
FIG. 7.

VARIABLE OPACITY, MAXIMALLY TRANSVERSE RETRACTING SUNROOF SYSTEM

This is a continuation of U.S. patent application Ser. No. 07/453,680, filed Dec. 20, 1989, abandoned.

BACKGROUND OF THE INVENTION

1. Field of the Invention

The present invention relates generally to vehicle sunroofs. More particularly the present invention relates to selective opacity sunroofs which extend between vehicle roof side rails and are retractable to allow opening of the passenger compartment of the vehicle.

2. Description of the Related Art

Sunroofs have long been a desirable feature of automotive type vehicles based upon their ability to create an opening in the vehicle roof skin and thereby provide a more open feeling to the passenger compartment. Obviously, the greater the area of the roof skin able to be uncovered, the greater will be the feeling of openess in the passenger compartment. Thus, makers of sunroofs have in the past provided various means of retracting sunroof panels rearwardly under or over the roof skin to provide open vehicle roofs. Sunroof makers have also sought to make these retractable panels serve as the roof skin for as much of the vehicle roof as possible both in the longitudinal and transverse axes of the vehicle. An early example of such a sunroof may be seen in U.S. Pat. No. 2,482,429 ('429).

However, with modern aerodynamic styling of automotive vehicles, certain structural changes have occurred in automobile roof construction which now necessitate adapting the structure and method of sunroof installation in order to provide the maximum roof skin opening.

Previously, an aperture was cut into the central portion of the original automobile roof skin to avoid the roof side rails. After cutting, a self-contained sunroof assembly, including a supporting frame and a movable panel; with its related hardware; were placed therein. Currently however, many automotive roof side rails are located closer to the longitudinal midline of the roof because the automobile doors extend into the plane of the roof for aerodynamic and styling reasons. To mount a self-contained sunroof mechanism in such a roof while avoiding the roof side rails, necessarily results in a narrower roof opening. Thus, the art now seeks to maximize the width of the sunroof while maintaining the aerodynamics of the vehicle. For example, U.S. Pat. No. 4,695,090 ('090) discloses the mounting of sunroof guide tracks within the original equipment side rails of automobile roofs. This mounting entails removing the top portion, if any, of the roof side rails and affixing the retractable sunroof guide tracks therein. The sunroof panel supported by the guide tracks is then extended door edge-to-door edge for the appearance of a sunroof panel covering the entire transverse area of the roof.

Thus, the prior art discloses either building the original roof structure to accommodate a maximally transverse, retracting sunroof panel, as in the '429 patent; or specially fitting individual sunroof assembly components into a slightly modified original vehicle roof frame, as in the '090 patent. The first option requires large initial tooling up costs to the original manufacturer for what may be a limited production run of vehicles. The second option requires different pieces for each type of vehicle roof frame and/or labor intensive retrofitting of the individual components to the slightly modified roof frame.

What is needed is a sunroof system which allows the retrofitting of an originally manufactured vehicle roof frame with a preassembled and self-contained sunroof assembly using parts readily adaptable to a variety of original equipment manufacture (OEM) roof frame types. This sunroof system should also retain the ability to provide a maximally transverse retracting sunroof panel. The present invention provides such a sunroof system.

A concurrent problem with known sunroofs which needs to be addressed, particularly as to maximally transverse sunroof panels, is the overabundance of sunlight admitted through a clear sunroof panel into a closed vehicle passenger compartment. While the presently popular clear sunroof panel has the advantage of allowing the vehicle passengers to see out through the vehicle roof, it affords little privacy to passengers, increases the greenhouse effect on the passenger compartment and lets the sun's rays prematurely age and fade the interior of the vehicle. As disclosed in U.S. Pat. No. 4,801,174 a prior solution to these problems was to add an additional sliding panel beneath the clear sunroof panel to act as a screen therefor.

Also known is the technique of applying an electrically operated laminate to automobile glass which can selectively vary its opacity according to desires of the operator. Such variable opacity laminated glazing may include suspended particle containing laminates such as liquid crystal or charged particle types as illustrated in Popular Science Magazine, November 1989 issue, at page 74.

Electrical connection to a selectively variable opaque window used as a sunroof panel is made difficult in that the sunroof panel must be movable, often not only longitudinally along the vehicle, but also up and down, as when the panel is to be retracted over the vehicle roof skin.

The present invention solves the aforementioned problems of the current art by providing a selective opacity sunroof panel with electrical power supplied thereto throughout the range of the sunroof panel movement.

The present invention thus provides a sunroof panel retractable to open the passenger compartment having a maximal opening in the transverse direction of the vehicle roof skin and whose opacity may be varied at the choice of the operator. The present invention is further adaptable to be easily added to a wide variety of automobile types as a retrofitted assembly.

SUMMARY OF THE INVENTION

A selectively opacity, maximally transverse, retracting sunroof system for a vehicle roof according to the present invention is disclosed as comprising:
(a) a strut assembly attachable to a part of the original vehicle roof side rail,
 (1) the strut assembly having a platform for supporting a self-contained sunroof mechanism;
(b) a self-contained sunroof mechanism having,
 (1) a frame for attachment to the strut assembly,
 (2) a guide track mounted on the frame for channeling the movement of a sunroof panel guide foot,
 (3) a sunroof panel guide foot movably mounted within the guide track for supporting and manipulating a sunroof panel, (4) a selective opacity sunroof panel mounted on the guide foot; and, (c) an electrical circuit for controlling the opacity of the sunroof panel the circuit having:

(1) a current source, (2) a first electrical conductor electrically connecting the current source to the guide track, (3) an electrical conductive strip located along the guide track and connected to the electrical conductor, (4) an electrical contact located on the guide foot, the contact electrically communicating with the conductive strip; and, (5) a second electrical conductor for connecting the guide foot electrical contact to the sunroof panel.

It will be understood by the artisan that the disclosed sunroof system can be used at the point of vehicle manufacture, or as a retrofitted system for a vehicle manufactured with a solid roof.

In retrofitting an automotive-type vehicle with the present invention, the OEM roof skin will be removed from the vehicle as will all but the side portions of the OEM roof side rails. A strut assembly specially adapted for supporting a self-contained sunroof mechanism will then be attached to the remaining OEM roof side rail structure. After installation of the strut assembly the self-contained sunroof mechanism will be installed as a unit as is a common practice in the art. Power and drive connections are then made to the mechanism, again as is common practice in the art.

The self-contained sunroof mechanism will ordinarily comprise a circumferential supporting trough providing a frame for attachment to the strut assembly and a carriage for other sunroof mechanism elements. The trough will also provide water channels for rain and will carry the guide tracks in each lateral side thereof. The guide tracks, located on opposite lateral sides of the sunroof mechanism, provide a channel for movement of the sunroof panel guide feet. The guide feet support the sunroof panel and contain the hardware necessary to permit the sunroof panel to move in relation to its ordinarily closed position as a member of the vehicle roof skin.

Affixed to the guide feet and supported thereby is a selective opacity sunroof panel. Selective opacity glazing is commercially available. The known glazing is a laminated panel with an electrically controlled charged particle layer located therein.

The sunroof panel is powered by converting the direct current of the vehicle electrical system into alternating current by use of an inverter. Opacity of the sunroof panel is selected by controlling the alternating current to the panel by means of a variable resistor controlled from within the passenger compartment. The controlled alternating current is fed to a conductive strip located in the guide tracks.

The guide feet are equipped with conductive springs which contact the conductive strips within the guide tracks. Each guide foot conductive spring is then wired to a separate side of the variable opacity laminate layer in order to induce a voltage thereacross and vary the light transmitting capability of the sunroof panel.

Other attendant advantages will be more readily appreciated as the same becomes better understood by reference to the following detailed description and considered in connection with the accompanying drawings in which like reference numerals designate like parts throughout the drawings, of which:

BRIEF DESCRIPTION OF THE DRAWINGS

FIG. 1 is a perspective view of an automobile utilizing the present invention.

FIG. 2 is a schematic representation of the electrical circuit of the present invention.

FIG. 3 is a transverse cross sectional view of a sunroof system according to the present invention.

FIG. 4 is a detailed front view of a guide foot-to-guide track electrical connection according to the present invention.

FIG. 5 is a side view of FIG. 4.

FIG. 6 is a partial cross sectional view of a guide track and guide foot assembly according to the present invention.

FIG. 7 is a top plan view of a sunroof panel according to the present invention shown in various stages of opacity.

DESCRIPTION OF THE PREFERRED EMBODIMENT

According to FIG. 1, there is shown a selective opacity, maximally transverse, retracting sunroof system 11. The preferred embodiment is illustrated as affixed to the roof 12 of an automobile 13. As seen in FIGS. 2 and 3, the sunroof system 11 generally comprises a strut assembly 14; a self-contained sunroof mechanism 16 having a selective opacity sunroof panel 18; and, an electrical circuit 20, illustrated schematically in FIG. 2, for controlling the opacity of the panel 18.

As the two lateral sides 15, 17 of the automobile 13 and the sunroof system 11, are substantially mirror images, only one side will described unless otherwise indicated.

As seen in FIG. 3, the strut assembly 14 has a lower arm 32 which is attached to the lower side rail part 30 by a rivet 29. The lower arm 32 extends upwardly from the lower side rail part 30 to define a platform 34 which is substantially parallel to the plane of the roof skin. The roof skin will be defined in the present embodiment by the sunroof panel 18 when it is in a closed position sealing the interior of the vehicle from the elements. A strut assembly "S"-shaped brace 36 is also fastened by the rivet 29 between the strut assembly lower arm 32 and the lower side rail part 30. The brace 36 extends upwardly therefrom to be attached by welding or the like to an upper side rail part 44, further bracing the strut assembly 14.

An additional brace 37 is attached at one end thereof to an exterior end 38 of the upper side rail part 44. The additional brace 37 then extends upwardly therefrom and bends over the upper OEM side rail part 44 and downward to provide an attachment surface for a trough side wall 40 of the sunroof mechanism 16. A gasket 48 for sealing against the door 24 and providing a water channel 50 for rain or the like is attached at an exterior end 46 of the additional brace 37. A trim panel 42 is attached over the additional brace 37 to provide a finished exterior appearance to the automobile roof 12. It will be appreciated that a variety of arrangements of elements in the strut assembly 14 are possible and that the invention is not limited to that arrangement specifically set forth; either in number and type of elements or their construction and arrangement.

The platform 34 provides a base on which to mount the trough bottom wall 35 of the self-contained SR mechanism 16. Because the trough is located close to the lateral sides 15, 17 of the vehicle roof, a maximally transverse sunroof panel 18 may be mounted thereon.

The strut assembly 14 provides good load bearing characteristics to support the added weight of the self-contained sunroof mechanism 16 and provides a platform 34 substantially parallel to the roof skin 18 for attachment of the sunroof mechanism 16 to the vehicle 13. The strut assembly 14 is also readily adaptable to a variety of roof configurations because it largely replaces the OEM roof side rail arrangement.

The self-contained sunroof mechanism 16 is attached on the strut assembly 14 by welding, mechanical fasteners, or by other suitable means. In the preferred embodiment, the self-contained sunroof mechanism 16 has a circumferential base trough 52, having a trough bottom wall 35 and trough side wall 40 connected to the strut assembly 14. The strut assembly platform 34 provides a base on which to mount the trough bottom wall 35 of the self-contained mechanism 16. The trough 52 provides a substantially rectangular frame for attachment of the sunroof mechanism to the strut assembly 14 and also provides a supporting body for the rest of the sunroof mechanism 16. The trough 52 also provides water management channels for the sunroof mechanism 16. The trough bottom wall 35 is bent upwardly at its interior end 54, i.e., opposite of the trough side wall 40 to provide a generally "U"-shaped trough 52. A vertical trough arm 39 extends upwardly from a trough side wall 40 to provide an attachment point for a sunroof panel gasket 41 which seals the passenger compartment from the elements when the sunroof panel 18 is closed.

As seen in FIG. 3 a guide track 56 is attached substantially along the length of the upper surface of the trough bottom wall 35, for channeling the movement of a sunroof panel guide foot 58 to which is attached the selective opacity sunroof panel 18, as further described below.

As seen in FIGS. 4 and 5, a nonconductive substrate 60 is located interiorly and laterally to the guide foot 58 within the guide track 56. The nonconductive substrate 60 has two upright members 61, 63 and a bight 62 and is generally "U"-shaped. The substrate 60 is fastened open side up by suitable means (not shown) to the guide track 56. Located within the bight 62 of the nonconductive substrate 60 is a conductive strip 64 of brass. Other suitable conductors may be employed dependant upon their corrosion and surface hardness characteristics. The bight 62 and the conductive strip 64 therein are narrow, so as to minimize the possibility of inadvertent electric shock from contact with the conductive strip 64.

As seen in FIGS. 3 and 4 and 6, the sunroof panel guide foot 58 is slidably mounted within the guide track 56 by means well known in the art, such as wheels, plates etc. The guide foot 58 supports the sunroof panel 18 at the lateral edges 19, 21 of the panel 18. The guide foot 58, in cooperation with link member 59, is constructed and arranged to provide means as are known in the art for lifting the panel 18 over the roof skin from a closed position, and for retracting the panel 18 rearwardly to provide an aperture 66 above the passenger compartment of the vehicle. Powered drive means (not shown) as known in the art may be provided to retract the panel 18 automatically if desired.

Attached to the guide foot 58 at a forward retaining bolt 68 thereof is a brass-plated conductive spring 70. The spring 70 has a loop 71 under the retaining bolt 68. The spring 70 extends downwardly therefrom in a first portion 72 having a greater arc to end in a second portion 74 having lesser arc which rests upon the conductive strip 64. The spring 70 provides an electrical contact for the guide foot 58 which is biassed toward contacting the conductive strip 64.

An electrically conductive wire 76 is connected between the spring 70 and one side of a charged particle layer 78. The charged particle layer 78 is a laminate layer which is located within the selective opacity sunroof panel 18. The particle layer 78 contains randomly orientated particles which block light transmission through the particle layer 78 until aligned therein by a voltage applied across the particle layer.

The selective opacity sunroof panel 18 is commercially available and contains therein the aforementioned charged particle layer 78. The panel 18 of the preferred embodiment currently uses an encapsulated liquid crystal laminate made by Taliq Co. which may vary its opacity according to a voltage applied across it as illustrated by FIG. 7. It will be appreciated that a variety of variable opacity layers such as liquid crystal or the like may be used in a vehicle roof as desired and not depart from the scope of the present invention.

Accordingly, in order to complete the electrical circuit acting to select the opacity of the sunroof panel 78, the conductive strips 64 located on opposite sides of the automobile 13 are connected to opposite sides 80, 82 of the particle layer 78. By locating conductor paths of the electrical circuit 20 on opposite sides of the automobile 13, the chance of a person inadvertently completing the circuit with bodily contact is substantially lessened.

The sunroof panel 18 is provided with an edge cap 84. The edge cap 84 is not necessary for the operation of the sunroof system 11 but is provided optionally as a decorative trim which may provide protection of the panel 18 and the electrical conductors therein. Abutting the edge cap 84 is the sunroof panel gasket 41 which seals the automobile roof 12 against the elements when the sunroof panel 18 is in the closed position.

As seen in FIG. 1, a second selective opacity roof panel 88 is fixedly attached to the automobile roof 12 behind the sunroof panel 18. The panels 18, 88 are controlled by common electrical circuitry to keep the opacity of the panels equal. Alternatively, the panels 18, 88 may be controlled separately if variable opacity between the panels is desired.

As seen in FIG. 2, the sunroof panel 18 opacity is controlled by an electrical circuit 20. The circuit 20 initially derives its current from the twelve volt direct current system 90 of the automobile 13. The twelve volt direct current source 90 is changed by an inverter 91 such as is known in the art, to a ninety volt alternating current source 92. Alternating current (AC) will keep the particles of the selective opacity sunroof 18 from migrating to one side of the charged particle layer 78.

It will be appreciated by the ordinarily skilled artisan that suitable electrical conductors will be provided for an operative electrical circuit of the type described herein, though such conductors may not be specifically called out herein.

The ninety volt AC current source 92 is then suitably controlled by a variable resistor 94 before reaching the respective guide track 56 supplying current to opposite sides 80, 82 of the charged particle layer 78.

The controlled current source downstream of the variable resistor 94 is then supplied by first electrical conductors 96 to the guide track conductive strips 64. Each guide foot conductive spring 70 then contacts its respective conductive strip 64. Each conductive spring 70 is connected by a wire 76 to an opposite side 80, 82 of the charged particle layer 78; thereby powering the selective opacity sunroof panel 18 through an operative electrical circuit.

By varying the voltage drop across the variable resistor 94, the orientation of the charged particles controlling the opacity of the sunroof panel 18 may be varied over a range from substantially clear 98 to substantially opaque 100, as seen in FIG. 7.

To use the sunroof system 11 in retrofitting an original equipment manufacturer vehicle, as seen in FIG. 3, OEM roof side rail 22 is removed by a pair of cuts 26 and 28 when the OEM roof skin (not shown) is removed for retrofitting the automobile 13 with the sunroof system 11. The OEM side rail portion adjacent to the automobile door 24 is left intact as a part for mounting the strut assembly 14. The strut assembly 14 is attached by a rivet 29 to a lower OEM side rail part 30.

A sunroof system according to the present invention will thus provide a sunroof panel covering the maximal transverse area of the vehicle. The sunroof panel may be retracted rearwardly to open the vehicle passenger compartment to the elements. Also, the opacity of the sunroof panel may be selected by the vehicle operator. The sunroof system is further easily retrofitted to a variety of different makes or models of vehicles. Should it be found desirable to provide substantially the entire roof area with selective opacity glazing, a second panel, either fixed or moving, could then be installed behind the first, or forward, sunroof panel.

Having, thus, described the present invention, what is claimed is:

1. A selective opacity retracting sunroof system for a vehicle in which at least a portion of the orignal roof panel has been removed, creating an opening defined in part by a pair of roof side rails, and in which an inboard portion of each of said roof side rails has been removed, leaving intact an outboard portion of each said side rail adjacent the vehicle door, the system comprising:
   (a) a strut assembly attached to said outboard portions of said vehicle roof side rails, said strut assembly extending inboard of and forming at least one closed cross section with said outboard portion of each said roof side rail;
   (b) a self-contained sunroof assembly having:
      (1) a frame attached to the strut assembly,
      (2) a guide track mounted on the frame,
      (3) a sunroof panel guide foot movably mounted within the guide track for supporting and guiding the movement of a sunroof panel, and
      (4) a selective opacity sunroof panel mounted on the guide foot; and
   (c) an electrical circuit for controlling the opacity of the sunroof panel, the circuit having:
      (1) a current source,
      (2) an electrically conductive strip located within the guide track,
      (3) a first electrical conductor electrically connecting the current source to said conductive strip,
      (4) an electrical contact located on the guide foot, the contact electrically communicating with the conductive strip, and
      (5) a second electrical conductor for connecting the guide foot electrical contact to the sunroof panel.

2. The sunroof system of claim 1 wherein the strut assembly further comprises a base platform for supporting the self-contained sunroof assembly.

3. The sunroof system of claim 2 wherein the base platform of the strut assembly lies in a plane substantially parallel to the plane of the vehicle roof skin.

4. The sunroof system of claim 1 wherein the electrical circuit further comprises a variable resistor for controlling a voltage applied to said sunroof panel.

5. The sunroof system of claim 1 wherein the selective opacity sunroof panel has a charged particle layer therein for varying the opacity of the sunroof panel.

6. The sunroof system of claim 1 wherein the frame is substantially rectangular.

7. The sunroof system of claim 1 further comprising:
   (a) a second guide track mounted to the frame; and
   (b) a second guide foot movably mounted in said second guide track.

8. The sunroof system of claim 7 wherein each conductive strip is electrically connected to the current source.

9. The sunroof system of claim 8 wherein each of the guide feet has an electrical contact to its respective conductive strip.

10. The sunroof system of claim 9 wherein each of the guide feet has an electrical connection to the sunroof panel.

11. The sunroof system of claim 9 wherein each said contact is a conductive spring attached to the guide foot.

12. The sunroof system of claim 1 further comprising a selective opacity glazing panel affixed to the vehicle roof adjacent the self-contained sunroof mechanism.

13. The sunroof system of claim 12 wherein the selective opacity sunroof panel and the selective opacity glazing panel have their opacity controlled by a common electrical circuit.

14. The sunroof assembly of claim 1 wherein said electrical contact located on the guide foot comprises a conductive spring biased toward contacting said conductive strip.

15. The sunroof assembly of claim 1 wherein said electrical conductive strip is enclosed on at least three sides by a nonconductive substrate, said substrate being mounted on said guide track.

16. The sunroof assembly of claim 1 wherein said strut assembly includes a lower arm which is attached to a lower portion of said side rail.

17. The sunroof assembly of claim 1 further comprising a second selective opacity sunroof panel disposed rearwardly of first said panel.

18. The sunroof assembly of claim 17 wherein the opacity of said second panel is controlled by the same electrical circuit which controls the opacity of said first panel.

19. A selective opacity retracting sunroof system for a vehicle in which at least a portion of the original roof panel has been removed, creating an opening defined in part by a pair of roof side rails, the system comprising:
   (a) a strut assembly attached to at least one portion of said vehicle roof side rails having:
      (1) a lower arm which is attached to a lower portion of said side rail; and
      (2) at least one brace, said brace having a first end and second end, wherein said first end is fastened between said strut assembly lower arm and said lower side rail portion and said second end is attached to an upper portion of said side rail;

(b) a self-contained sunroof assembly having:
  (1) a frame attached to the strut assembly,
  (2) a guide track mounted on the frame,
  (3) a sunroof panel guide foot movably mounted within the guide track for supporting and guiding the movement of a sunroof panel, and
  (4) a selective opacity sunroof panel mounted on the guide foot; and
(c) an electrical circuit for controlling the opacity of the sunroof panel, the circuit having:
  (1) a current source,
  (2) an electrically conductive strip located within the guide track,
  (3) a first electrical conductor electrically connecting the current source to said conductive strip,
  (4) an electrical contact located on the guide foot, the contact electrically communicating with the conductive strip, and
  (5) a second electrical conductor for connecting the guide foot electrical contact to the sunroof panel.

20. A retracting sunroof system for a vehicle in which at least a portion of the original roof panel has been removed, creating an opening defined in part by a pair of roof side rails, and in which an inboard portion of each of said side roof rails has been removed leaving intact an outboard portion of each said side rail adjacent the vehicle door, the system comprising:

(a) a strut assembly attached to at least one portion of said vehicle roof side rails, said strut assembly extending inboard of and forming at least one closed cross section with said outboard portion of each said roof side rail;
(b) a self-contained sunroof assembly having:
  (1) a frame attached to the strut assembly,
  (2) a guide track mounted on the frame,
  (3) a sunroof panel guide foot movably mounted within the guide track for supporting and guiding the movement of a sunroof panel; and
(c) a sunroof panel mounted on the guide foot.

21. The sunroof system of claim 20 wherein said strut assembly includes a lower arm which is attached to a lower portion of said side rail.

22. The sunroof system of claim 21 further comprising at least one brace, said brace having a first end and second end, wherein said first end is fastened between said strut assembly lower arm and said lower side rail portion and said second end is attached to an upper portion of said side rail.

23. The sunroof system of claim 20 further comprising:
(a) a second guide track, each said guide track being mounted to an opposite lateral side of the frame; and
(b) a second guide foot movably mounted in said second guide track.

* * * * *

UNITED STATES PATENT AND TRADEMARK OFFICE
CERTIFICATE OF CORRECTION

PATENT NO.  : 5,261,722
DATED       : November 16, 1993
INVENTOR(S) : Dennis W. Staley; Brad Garska; Werner T. Heuhn It is certified that error appears in the above-indentified patent and that said Letters Patent is hereby corrected as shown below:

On the Title Page under "Other Publications", line 2, "Blug" should be -- Blue --.

Column 1, line 17, "a" should be -- an --.

Column 4, line 34, after "will" insert -- be --.

Column 7, line 36, "orignal" should be -- original --.

Column 8, line 51, "first said" should be -- said first --.

Signed and Sealed this

Second Day of August, 1994

Attest:

BRUCE LEHMAN

*Attesting Officer*      *Commissioner of Patents and Trademarks*